United States Patent [19]

Nogami

[11] 4,257,498

[45] Mar. 24, 1981

[54] ANTI-RUST COVER FOR A DISC ROTOR OF A VEHICLE DISC BRAKE

[75] Inventor: Tomoyuki Nogami, Toyota, Japan

[73] Assignees: Toyota Jidosha Kogyo Kabushiki Kaisha, Aichi, Japan; Toyota Jidosha Kogyo Kabushiki Kaisha, Aichi, Japan

[21] Appl. No.: 65,050

[22] Filed: Aug. 9, 1979

[30] Foreign Application Priority Data

Jul. 4, 1979 [JP] Japan ............................. 54-46107[U]

[51] Int. Cl.³ ............................................ F16D 65/00
[52] U.S. Cl. ................................................ 188/218 A
[58] Field of Search ..................... 188/1 R, 2 R, 18 A, 188/218 A, 264 AA, 264 G

[56] References Cited

U.S. PATENT DOCUMENTS 4,005,768  2/1977  Bubnash et al. ................. 188/218 A

FOREIGN PATENT DOCUMENTS 2814252  10/1978  Fed. Rep. of Germany ...... 188/218 A

*Primary Examiner*—Duane A. Reger
*Attorney, Agent, or Firm*—Browdy and Neimark; Browdy and Neimark

[57] ABSTRACT

An anti-rust cover for a disc rotor used in a vehicle disc brake. It is characteristically provided, as a means of attaching the same to the dust cover, with a combined engaging mechanism composed of at least three engaging members in all, i.e., at least one inside engaging member and at least one outside engaging member, arranged alternatively with a predetermined circumferential phase difference on the inner surface thereof confronted to the dust cover, near the outer periphery of the anti-rust cover. It is to be snugly attached to the dust cover by being fitted-in by the outer periphery of the dust cover between the inside engaging member(s) and the outside engaging member(s).

7 Claims, 15 Drawing Figures

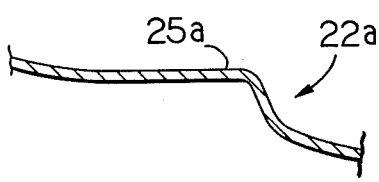
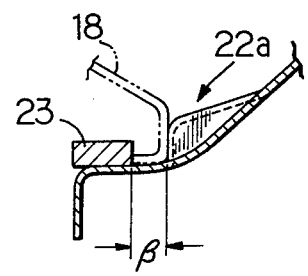
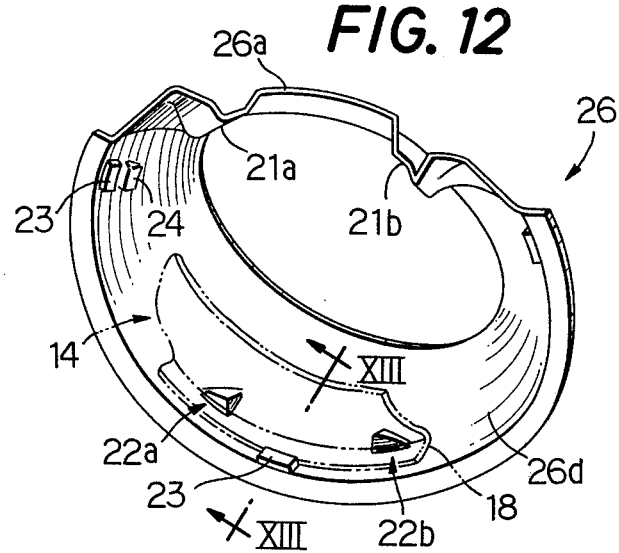
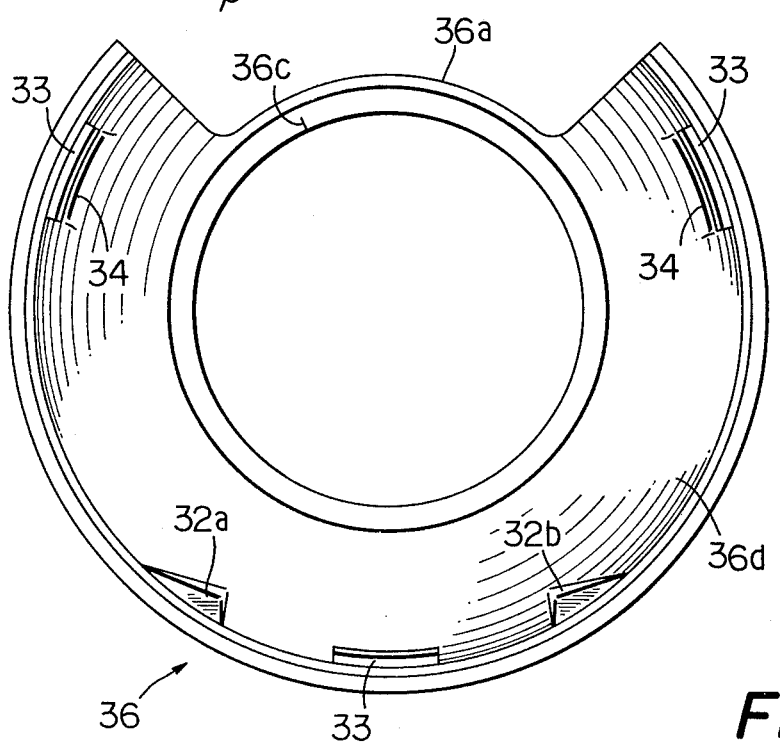
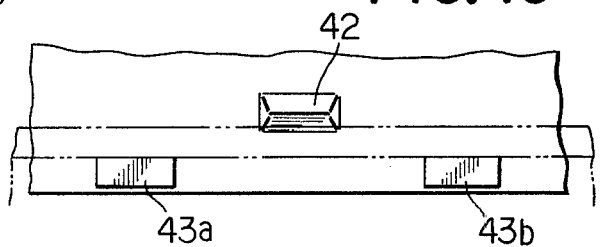

ANTI-RUST COVER FOR A DISC ROTOR OF A VEHICLE DISC BRAKE

BACKGROUND OF THE INVENTION

This invention relates to an anti-rust cover for a disc rotor in a disc brake used for a vehicle, more particularly, to one which is improved in its attachability, eliminating erroneous attaching thereof, onto the dust cover. The improvement involves disposing a combination of engaging members, as a means of attaching the anti-rust cover onto the dust cover, on the inner surface of the anti-rust cover in the vicinity of its outer periphery. The combination is composed of at least three pieces in number and arranged on the outer and inner side alternatively in order to have fitted therebetween the outer periphery of the dust cover. The curled periphery of the dust cover is to be snugly fitted, in an easy and accurate manner, between the innerly and outerly arranged engaging members. A stable and fixed attaching of the anti-rust cover onto the dust cover by means of the novel combination of engaging members is the gist of the improvement, i.e., the essence of this invention, which has eliminated the disadvantages of the prior art.

A disc rotor in a vehicle disc brake which is rotated with a wheel in a body is usually made of case iron, so it is very likely to produce rust. Especially when a vehicle with such a disc rotor is transported in an ocean going vessel, it is often subjected to sea wind containing much salt while it is in waiting for the loading at the pier. In the meantime the disc rotor is likely to be rusted.

The rust produced on the surface of the disc rotor causes the brake pad urging the same to be worn out and the friction coefficient to decrease, accompanying a byproblem of deterioration of the braking performance. As a measure of anti-rusting, an application of anti-rusting treatment on the surface of the disc rotor is generally considered. Coating of an anti-rusting material, for example, on its surface may result in a deficiency of the braking force through the decreasing of the friction coefficient of the rotor surface. It is therefore desirable that the disc rotor in the unloaded vehicle in the importing land still holds a remnant of anti-rusting material after the vehicle is delivered to the customer. If the anti-rusting material is removed earlier than the vehicle is delivered, the above-mentioned problem of rust producing conditions unsolved. For this reason, the coating of an anti-rusting material is usually regarded as impracticable. The general idea of preventing the rust, instead of the coating, has been to cover the disc rotor in order to physically protect it from rusting.

The general conventional practice has been therefore to attach an annular shaped anti-rust cover made of synthetic resin or cardboard to the dust cover, which is usually secured within a wheel on the inner side of the disc rotor (nearer to the center of the chassis), in order to cover the outer side of the disc rotor. This anti-rust cover, being attached on the outer periphery of the dust cover to cooperate therewith in enveloping the disc rotor for preventing the salty sea wind ingressing or flowing into the coverage, achieves a degree of anti-rusting effect.

The anti-rust cover is temporary, not being for permanent use, i.e., the anti-rusting while the vehicle is in the ocean going transportation route. So it must be attached before the transportation phase, during which the disc rotor and removed after the transportation subjected to rusting is over, that is, prior to the delivery to the customer. With the purpose mentioned above, conventional way of attaching the anti-rust cover onto the outer periphery of the dust cover was to dispose a plurality pairs of engaging members, on the inner surface of the anti-rust cover faced to the dust cover, each pair composed of an inner (inside) and outer (outside) engaging members arranged in confrontation to each other in the radial direction of the anti-rust cover. This way of arrangement of the engaging members in a mutually confronted position inherently results in a few troublesome problems. Fitting of the outer periphery of the dust cover accurately between the inner and outer engaging members is somewhat difficult operation; it is liable to rest on the inner side engaging member, instead of being snugly fitted therebetween. Such an inaccurate fixing of the anti-rust cover gives rise to an unexpected detaching thereof in the running of the vehicle; moreover the dust cover sometimes needs re-mounting. As the anti-rust cover is normally located in a very narrow space, within the wheel filled with some other deterrent parts, sandwiched between the disc rotor and the wheel disc, it is extremely difficult or troublesome to insert or reach out a hand into this narrow space or to handle it by lying on one's back beneath the vehicle chassis if. Even an accurate fitting were to be achieved, necessary requirement of a certain clearance between the outer and inner side engaging members, which is needed for the improvement of the attachability of the anti-rust cover, often impairs operator's feeling of snugness or right-fitting between the two. The above lack of right-fitting feeling may cause an erroneous attaching or sometimes a dropping of the anti-rust cover due to the vehicle vibration during the driving.

SUMMARY OF THE INVENTION

This invention was made against the above-described background. It is therefore a primary object of this invention to provide an improved anti-rust cover in its attachability to the dust cover and correct yet easy fitting of the same onto the outer periphery of the dust cover; it must be an anti-rust cover capable of eliminating the inconvenience of the prior art, such as erroneously resting the dust cover periphery onto the inside engaging member of the anti-rust cover, enhancing the feeling of fitting snugness, and holding the outer periphery of the dust cover securely without any jolting between the skillfully arranged inside and outside engaging members in order to prevent the dropping of the anti-rust cover due to the vehicle vibration during the running.

In order to achieve the above-stated object, the anti-rust cover above-mentioned has to be provided, as a means of attaching the anti-rust cover onto the dust cover, with a sort of combination of engaging members which is composed of at least three in number arranged, on the surface of the anti-rust cover faced to the dust cover, alternatively with a predetermined circumferential distance from each other such that an outside engaging member is located radially more toward the outside than an inside engaging member. The present invention is characterized in that the dust cover can be snugly fitted and securely held between the skillfully arranged inside and outside engaging members.

BRIEF DESCRIPTION OF THE DRAWINGS

FIG. 11 is a sectional view, taken along the line of XI—XI, of FIG. 10;

FIG. 12 is an explanatory view showing an attached status of the anti-rust cover of FIG. 7;

FIG. 13 is a cross sectional view of a part of FIG. 12 taken along the line of XIII—XIII;

FIG. 14 is an elevational view of a second embodiment of the anti-rust cover of this invention and;

FIG. 15 is a projectional view, corresponding to a portion of FIG. 10, of the salient feature a third embodiment of this invention.

DETAILED DESCRIPTION OF THE PREFERRED EMBODIMENTS

Referring to the attached drawings preferred embodiments will be described hereunder.

Figure 1:
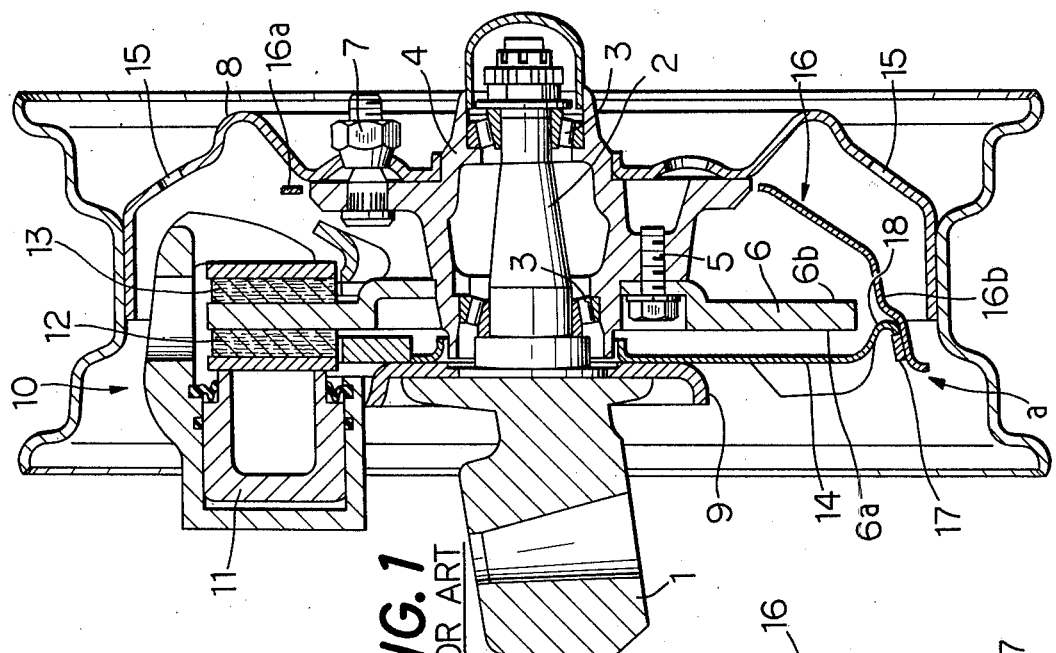
FIG. 1 is a cross-sectional view of a wheel for showing the environment of the disc brake with an anti-rust cover attached.

In FIG. 1, which shows a cross section of a driven vehicle wheel containing a disc brake in it, the wheel is provided with a knuckle 1, a shaft 2 secured to the knuckle 1, a hub 4 rotatably carried by the shaft 2 via bearings 3, a disc rotor 6 secured to the hub 4 by a bolt 5, a wheel disc 8 secured to the hub 4 by a bolt 7, a caliper supporter 9 secured to the knuckle 1, and a caliper which is secured to the caliper supporter 9 and generally designated by the numeral 10. Between the disc rotor 6 and the caliper 10 are disposed a pair of friction pads 12, 13; and in the caliper 10 is slidably disposed a piston 11 for urging the friction pads 12, 13 onto the disc rotor 6.

Figure 2:
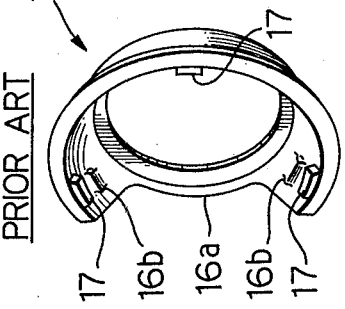
FIG. 2 is a perspective view of a conventional anti-rust cover to be attached for covering the disc rotor of the disc brake.
Figure 3:
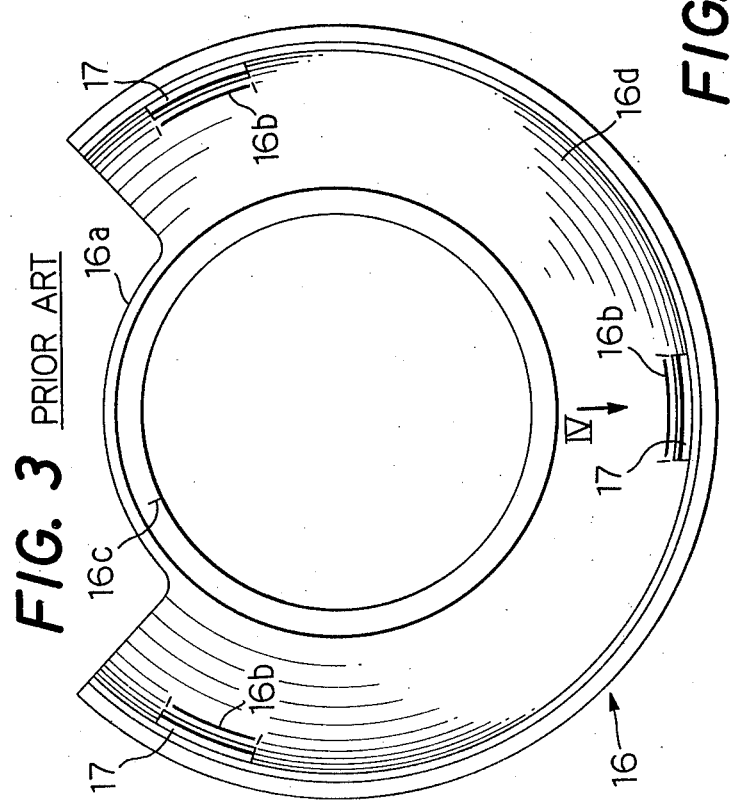
FIG. 3 is an elevational view of the anti-rust cover in FIG. 2.
Figure 4:
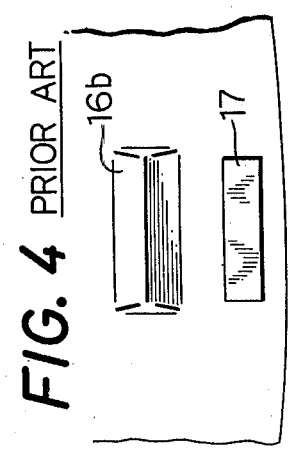
FIG. 4 is a projectional view of a part of FIG. 3 seen from the direction of the arrow IV.

On the caliper supporter 9 is attached a dust cover 14 in a confronted posture to the inner side 6a of the disc rotor 6 so as to cover the inner side thereof. The dust cover 14 functions to protect the disc rotor 6 from being stuck with foreign material such as dust. On the other hand, the wheel disc 8 is generally provided with an air introducing hole 15 for cooling the disc rotor 6 by the flowing-in air. This air introducing hole 15 hitherto often allowed air containing some salt to come into the wheel disc 8, when the vehicle was placed in the neighborhood of a harbor for exportation, which produced rust there, especially on the outer surface 6b of the disc rotor 6. In order to prevent the ingress of the salty air thereinto, an anti-rust cover 16 (hereinafter called simply cover unless there is confusion) was proposed to be placed between the disc rotor 6 and the wheel disc 8. An example of this kind conventional anti-rust cover 16, shown in FIGs. 2–4, is provided with a bridge portion 16a, where a part of an annular hat portion 16d of a truncated cone type with a gentle slope is partly cut away to form the bridge portion 16a of narrow width. This cover 16 is further provided with, on the inner surface thereof, a plurality of pairs (in this instance 3) of a projection 16b protruding inwards and a piece of fixing plate 17 (hereinafter called sometimes a plate member 17), which is attached nearer to the periphery of the hat portion 16d with a predetermined distance from the projection 16b, those plurality of pairs being arranged with a predetermined circumferential phase difference from each other. Between the projection 16b and the plate member 17 can be snapped in a peripheral trough-shaped portion 18 (curled portion outwardly bent) of the dust cover 14. This allows the cover 16 to be removably attached to the dust cover 14. The bridge portion 16a is further provided with a slit portion 16c.

Sucn an anti-rust cover 16 is to be attached only temporarily until the vehicle be delivered to the customer, which requires the same to be easily attached and detached, low in manufacturing cost, and light in weight. Considering those necessary conditions the article is generally made of synthetic resins such as polyvinylchloride, polyethylene, polypropylene, etc., or cardboard (sometimes impregnated with wax when necessitated).

Figure 5:
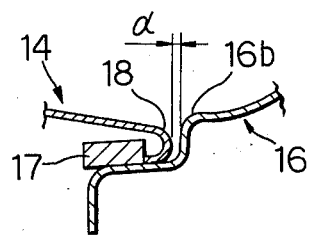
FIG. 5 is an enlarged explanatory view of the "a" part of FIG. 1.
Figure 6:
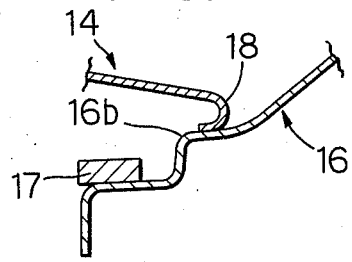
FIG. 6 is a partially enlarged view of a conventional anti-rust cover, corresponding to the "a" part of FIG. 5, for explaining an example of erroneous fitting.

When the cover 16 is attached to the dust cover 14, a certain clearance $a$ will be left, as can be seen in FIG. 5, between the curled portion 18 formed on the outer periphery of the dust cover 14 and the projection 16b (for engaging). This clearance $a$ (called play or a backlash) is, so to speak a necessary evil essential for the conventional cover 16, which consequently is likely to impair the feeling of snug fitting (stable fitting) of the curled portion 18 of the dust cover 14 between the projection 16a and the plate member 17 and sometimes causes an erroneous attaching (fitting) of the cover 16 such as resting of the dust cover 14 on the projection 16b, instead of justly fitting into the place (because of a structural weak point, i.e., a rightly confronted positioning or alignment of the two members, the projection 16b and the plate member 17). If and when the cover 16 is attached to the dust cover in such an erroneous attachment status, that is, the resting of the dust cover 14 on the projection 16b (especially when the cover 16 is a type wherein the bridge portion 16a is abutted at its later described holding portions to the caliper 10), the holding portions will fall into between the caliper 10 and the hub 4, rendering the same caught-in or hemmed between the two parts. When a vehicle with such a misattached cover 16 is placed in user operation, without correction the presence of the cover 16 may be a problem.

This invention has solved the problems, eliminating all of the disadvantages of the conventional type anti-rust cover, by completely changing the structural concept of the cover 16, particularly regarding the engaging portions with the dust cover 14, as clearly shown in FIGS. 7–13.

Figure 7:
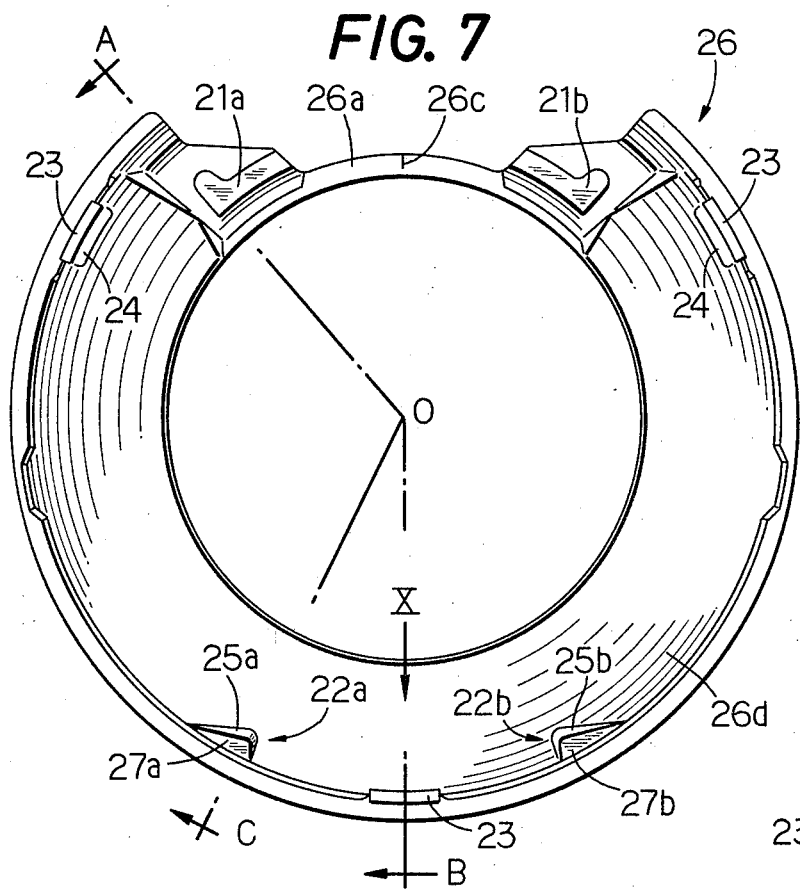
FIG. 7 is an elevational view of an anti-rust cover in accordance with this invention.
Figure 8:
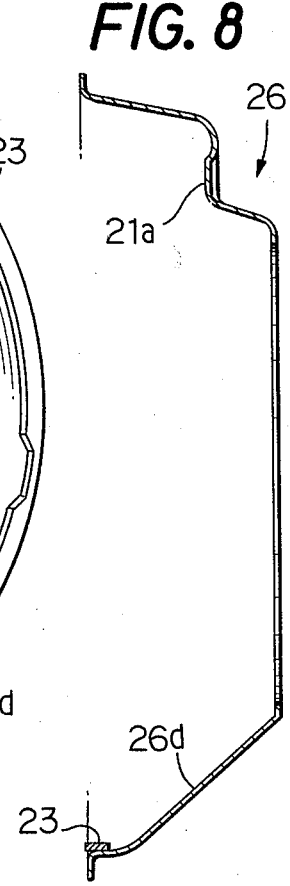
FIG. 8 is a sectional view, taken along the line AOB, of FIG. 7.

In a first embodiment of the invention, the anti-rust cover is indicated generally with the numeral 26 in FIG. 7 and others. It is substantially of truncated cone shape, similar to the conventional one shown in FIGS. 2–4, and of substantially annular shape, as can be observed in its elevational view. Besides, it is similarly shaped as the conventional ones in having an annular hat portion 26d, a bridge portion 26a, being formed by cutting away a part of the hat portion into a width-narrowed arcuate portion, and a notch or slit 26c formed nearly in the central portion of the bridge portion 26a. The bridge portion 26a is for preventing interference with the caliper 10 when being attached, and the notch 26c is for an easy breakage of the cover 26 from that portion when being detached off the disc rotor 6.

In the cover 26 a pair of holding portions 21a, 21b are formed on the two bordering positions between the hat portion 26d and the bridge portion 26a for being abutted thereat to the caliper 10, when the cover 26 is attached in place, in order to elastically holding or securing the cover 26 there.

An engaging mechanism characteristic to this invention is disposed on the inner surface of the cover 26, i.e., on the confronted side to the dust cover 14, in the vicinity of the outer periphery of the hat portion 26d of the cover 26 and at a symmetrical position from the bridge portion 26a relative to the cover center O. This engaging mechanism, composed of a pair of engaging projections 22a, 22b (inside engaging member) integrally formed with the cover 26, keeping a predetermined circumferential distance to each other, and a piece of plate member 23 (outside engaging member) disposed centrally in the circumferential relation between the both projections 22a, 22b while having a certain predetermined distance $\beta$ outwardly from the inside engaging members 22a, 22b in relation to the cover surface. In other words, the mechanism this first exemplary embodiment is composed of three member disposed on the inner surface, near the outer periphery, of the cover hat portion symmetrically away from the bridge portion, and arranged with a predetermined circumferential phase difference as well as a predetermined radial distance between the inside engaging members and the outside engaging member in relation to the cover surface. Another engaging mechanism disposed two in this embodiment, located in the hat portion 26d near the left and right end of the bridge portion 26a, is respectively composed, similarly to the prior art, of an inside engaging projection 24 and an outside plate member 23 (see FIG. 4 in this respect).

When the cover 26 of such a structure is attached to the dust cover 14, the curled portion 18 of the latter can be put in place, while alternatively abutting the inside and outside engaging memebers, by taking advantage of the resilience of the dust cover 14 in particular as well as that of the cover 26, as shown in FIG. 12. It brings about great advantages such as, dispensing with the clearance $\alpha$ in the prior art and allowing the distance $\beta$ between the plate member 23 and the projection 22a (22b) to be identical to the width of the curled portion 18 or slightly smaller than that width (see FIG. 13 in this respect). This fact greatly enhances the certainly of holding of the curled portion 18, which is a great improvement of snugness with regard to the attaching of the cover 26 in place and contributes in large measures to the prevention of accidental detaching of the cover 26 due to vibration during the vehicle, virtually eliminating this possibility driving. Besides, this embodiment eliminates the erroneous attaching operation which would result from resting the curled portion 18 of the dust cover 14 on the inside engaging member, as was the case in the prior art, by the new arrangement of the engaging members, being positioned alternatively in circumferential relation instead of a mutually confronted positioning as in the prior art. It refers to the offset positioning, in the circumferential relation, of the inside engaging members 22a and 22b with the outside engaging member 23 (it means that the inside engaging members are not confrontedly arranged to the outside engaging member as in the prior art). This feature is closely concerned with the elimination of the otherwise advantageous attaching, resulting in the prevention of falling of the holding portions 21a, 21b into between the caliper 10 and the hub 4.

Figure 9:
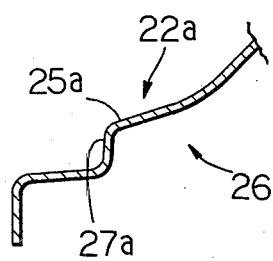
FIG. 9 is a sectional view, taken along the line OC, of FIG. 7.
Figure 10:
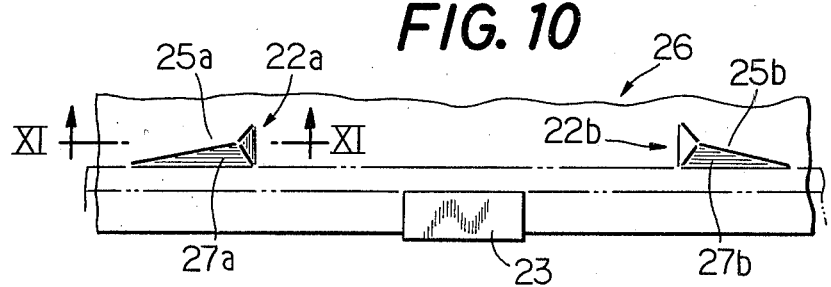
FIG. 10 is a projectional view of a part of FIG. 7 seen from the direction of the arrow X.

The inside engaging members (projections) 22a, 22b are formed, as shown in FIGS. 9-11, such that they do not form any recess or stepped portion in the axial direction of the cover 26 (horizontal direction in FIG. 8), but form a substantially continuous uptrend slope surface 25a, 25b starting from the hat portion 26d up to the zenith of the projection 22a, 22b (see FIG. 9), and the slope surface 25a, 25b is concurrently shaped ito a continuous uptrend one toward the other member mutually. In other words, the slope is, in relation to the two directions, formed into a continuous acclivity. It makes possible the sliding of the curled portion 18 of the dust cover 14 up along the slope surface 25a, 25b to the zenith thereof before it is smoothly dropped into the place to be fitted along an almost perpendicular surface 27a, 27b of the projection 22a, 22b. This smooth and tight fitting of the cover 26, leaving no clearance, into the desired place greatly enhances the assemblability (easiness of assemblying) as well as the feeling of an achievement of snugness.

FIG. 14 illustrates another embodiment of the invention, wherein the cover 36 is different from the previously described embodiment in being held without abuttment to the caliper body means of the holding portions 21a, 21b and being supported at five points such that two of them are respectively a pair of engaging members, a projection 34 and a plate member 33, located in the hat portion 36d near the left and right end of the bridge portion 36a. The remaining three holding portion are the same as in the previous embodiment, i.e., the two engaging projections 32a, 32b and the plate member 33 located outwardly relative to the cover surface from the two projections 32a, 32b, being arranged alternatively with a predetermined circumferential distance. In this five-point supporting type, the interference or gripping of the cover 36 is more stable than in other types, being more advantageous in preventing a drop or fall of the cover from the place. This second embodiment has favorably contributed to simplification of the tolerance (allowance) requirement of the dust cover 14, that is to say only, the height ($\beta$) of the curled portion which is to be fitted between the engaging members has to be carefully controlled.

The gist of the present invention resides in that inside engaging members (such as projections 22a, 22b, etc.) and outside engaging members (23, 33, etc.) are alternatively arranged in the circumferential direction with a predetermined interdistance, and that the outer periphery (curled portion) of the dust cover 14 is fitted into the clearance $\beta$ formed in the generating line direction of the cover between the engaging members on both sides for being securely supported therein. Therefore, the number of the engaging members must be at least three in all. From the standpoint of easiness of attaching, the least number three of the engaging members is most preferable. Regarding the arranging order of the inside and outside engaging members, and the form, the forming way of the inside engaging members, the above descripted embodiments seem to be the best from the view point of attaching easiness and sureness. Of course this invention is not limited to those examples. An engaging mechanism illustrated in FIG. 15 is constituted of two of the outside plate members 43a, 43b and one inside projection 42 positioned farther from the periphery of the cover than the outside projections, which is good intended for the purpose. The inside engaging projections may be a simple projection protruded from the cover surface, as in the prior art. It is also permissible that the projections are separately made and be attachable to the cover, instead of being ones integrally formed with the cover itself, as in case of the plate member (23, 33, etc.), for the purpose of forming inside engaging members.

The above description is only for exemplifying the invention, not for limiting the same at all. Various modifications and variations are of course possible without departing from the spirit and scope of the invention.

What is claimed is:

1. In an anti-rusting arangement for a disc rotor of a vehicle disc brake which includes a disc rotor integrally rotatable with a wheel, a dust cover coving the inner side of the disc rotor and an anit-rust cover faced toward and covering the outer side of the disc rotor, the anti-rust cover being retained by being removably attached to the outer periphery of the dust cover, an improvement wherein said anti-rust cover is provided, for attaching said anti-rust cover to said dust cover, with a combined engaging means comprising at least three engaging members including at least one inside engaging member and at least one outside engaging member located radially outside, in relation to a surface of said anti-rust cover which is faced toward said dust cover, than said at least one inside engaging member, all of said engaging members, at least three in all, being arranged alternatively along the circumferential direction on said surface of said anti-rust cover with a predetermined distance to each other securely holding the outer periphery of said dust cover fitted between said inside and said outside engaging members.

2. An anti-rust arrangement as set forth in claim 1, wherein the brake includes a caliper and said anti-rust cover includes an annular shape hat portion of generaly truncated cone configuration and an arcuate bridge portion defined by a cut away part of said hat portion preventing interference with said caliper of said disc brake, said anti-rust cover being provided with said combined engaging, means composed of said inside and said outside engaging members alternatively arranged at points of said hat portion symmetrically away from said bridge portion in relation to the center of said anti-rust cover, and a pair of second engaging means disposed respectively in said hat portion near lateral ends of said bridge portion and wherein each of said second engaging means is composed of two further engaging members engaged with the outer periphery of said dust cover fitted therebetween.

3. An anti-rust cover as set forth in claim 8 or claim 2, wherein said at least one inside engaging member of said combined engaging means is a projection integrally formed with, by protruding a part of said surface of, said anti-rust cover, and said at least one outside engaging member of said combined engaging means is a piece of rectangular plate secured on said surface of said anti-rust cover.

4. An anti-rust cover as set forth in claim 1, wherein said combined engaging means is composed of a pair of inside engaging members and one outside engaging member, and the former and the latter are alternatively arranged to each other along the circumferential direction on said surface of said anti-rust cover.

5. An anti-rust cover as set forth in claim 4, wherein said pair of inside engaging members are respective projections integrally formed with, by protruding respective parts of said surface of said anti-rust cover, and each of said projection has a progressive uptrend slope starting from said surface in a generating line direction of said anti-rust cover as well as in a direction oriented toward a respect opposite member.

6. An anti-rust cover as set forth in claim 1, wherein said combined engaging means is composed of a pair of outside engaging members and one inside engaging member, and the former and the latter are alternatively arranged to each other along the circumferential direction on said surface of said anti-rust cover.

7. An anti-rust cover as set forth in claim 1, wherein said inside and said outside engaging members which constitute said combined engaging means are spaced from each other, the distance between the former and the latter in the generating line direction of said surface of said hat portion being substantially equal to but not greater than, the width of a curled portion of said dust cover.

* * * * *